United States Patent [19]

Bender et al.

[11] Patent Number: 5,462,617

[45] Date of Patent: Oct. 31, 1995

[54] TIRE BONDING SYSTEMS

[75] Inventors: David L. Bender; William C. Bryan; William Brugman; Laurence Carlson, all of Muscatine; Charles E. Fox, Durant, all of Iowa

[73] Assignee: Bandag Licensing Corporation, Muscatine, Iowa

[21] Appl. No.: 248,526

[22] Filed: May 24, 1994

Related U.S. Application Data

[63] Continuation of Ser. No. 845,930, Mar. 5, 1992, abandoned, which is a continuation of Ser. No. 755,000, Sep. 5, 1991, abandoned, which is a continuation-in-part of Ser. No. 530,305, May 30, 1991, abandoned.

[51] Int. Cl.$^6$ .......................... B29D 30/54; B29D 30/56
[52] U.S. Cl. .......................... 156/96; 156/314; 156/331.4
[58] Field of Search .......................... 156/95, 96, 97, 156/307.3, 314, 331.4, 909

[56] References Cited

U.S. PATENT DOCUMENTS

| | | | |
|---|---|---|---|
| 3,769,121 | 10/1973 | Martin | 156/96 |
| 4,390,678 | 6/1983 | LaBelle | 156/331.4 |
| 4,434,832 | 3/1984 | Koch | 156/97 |
| 4,465,535 | 8/1984 | Fieldhouse | 156/97 |
| 4,595,445 | 6/1986 | Hombach | 156/331.4 |

FOREIGN PATENT DOCUMENTS 0316666  5/1989  European Pat. Off. .

OTHER PUBLICATIONS

Kirk–Othmer, Encyclopedia of Chemical Technology, vol. 23, 3rd Ed. pp. 596–599.

Primary Examiner—Michael W. Ball
Assistant Examiner—Daniel J. Stemmer
Attorney, Agent, or Firm—Nixon & Vanderhye

[57] ABSTRACT

A method and adhesive system for bonding at least two elastomeric substrates together. The method comprises subjecting the substrates to a priming treatment followed by applying to the primed substrates a heat-curable polyurethane adhesive composition comprising an isocyanate-terminated prepolymer and a polyhydroxide compound. The surfaces of the substrates so treated are contacted and subjected to heat-curing to bond the substrates together.

16 Claims, No Drawings

TIRE BONDING SYSTEMS

This is a Rule 62 continuation of of application Ser. No. 07/845,930, filed Mar. 5, 1992, now abandoned, which is a continuation of application Ser. No. 07/755,000, now abandoned filed Sep. 5, 1991 which is a continuation-in-part of 07/530,305 filed May 30, 1991, now abandoned.

The present invention relates to a method for bonding elastomeric substrates together. More particularly, the present invention relates to a method for bonding an elastomeric tread material to a tire casing using a heat-curable polyurethane adhesive composition.

BACKGROUND OF THE INVENTION

It is known from U.S. Pat. No. 4,544,427 to Hausch to bond tire tread or lugs to tire casings using an amine curable polymer or prepolymer system at ambient temperature. The process involves applying to the substrate a treating agent which may be a N-halohydantoin, N-haloamide, N-haloimide, or combinations thereof and applying to the treating agent an amine curable polymer or prepolymer with an amine curing agent. A polar solvent is added in order to facilitate curing, and the system is cured at ambient temperature to bond the substrates together.

The amine curing agents employed in the above methodology have the drawback that they are caustic and exhibit a high degree of toxicity. Toxicity is a also a feature associated with the polar solvent used to effectuate curing. In light of these drawbacks, the present inventors have sought to develop a bonding system which avoids the use of amine curing agents and polar solvents and results in improved bonding effect.

SUMMARY OF THE INVENTION

According to one aspect of the invention, there is provided a method for bonding at least two elastomeric substrates together using a heat-curable polyurethane adhesive composition comprising an isocyanate-terminated prepolymer and a polyhydroxy compound. The method comprises subjecting the substrates to a priming treatment, followed by applying the heat-curable polyurethane adhesive composition to the primed substrates, and heat-curing to bond the substrates together.

According to another aspect of the invention, there is provided a system for bonding at least two elastomeric substrates together. The system comprises, as a first component, a priming agent for example a halogen-containing priming agent and, as a second component, a heat-curable polyurethane adhesive composition comprising an isocyanate-terminated prepolymer and a polyhydroxide compound.

DETAILED DESCRIPTION OF THE INVENTION

In the following description, reference will be made to the invention as it applies to the bonding of a tire tread to a tire casing. However, it is to be understood that the invention is not limited to that particular application, and may be employed in the fabrication of other laminated elastomeric articles, such as, for example, conveyor belts, hoses, and the like.

The tire casing and tread substrates which are to be used are formed from rubber compounds which have been cured according to conventional techniques. Such rubber compounds contain olefinic unsaturation in their polymer chains, and include natural rubber, synthetic polyisoprene, polybutadiene, butadiene-isoprene copolymers, rubbery copolymers of butadiene and styrene, rubbery copolymers of butadiene and acrylonitrile, rubbery copolymers of isoprene and isobutylene, polychloroprene, ethylene-proplylene rubbers, and the like.

The term "natural rubber" as used herein means an elastomeric substance obtained from various trees and plants which generally grow in the tropics or desert portions of the world. Natural rubber contains a very high content, typically in excess of 90% or more, of cis-1-4-polyisoprene.

Prior to subjecting the tire casing to the priming treatment, the casing is allowed to equilibrate at ambient indoor temperature and humidity for a period of time, typically about 10 to 15 hours. Visible surface moisture on the casing is removed, and holes or other damage to the casing are repaired.

The surface of the casing onto which the tread is to be bonded is then subjected to a conventional buffing procedure in order to clean the surface and provide a roughened surface to enhance bonding with the tread. The buffing is carried out using conventional tire buffing equipment. Buffing of the casing is carried out until the desired buffing depth and casing surface radius are obtained, in accordance with predetermined tire specifications.

The tire tread is also subjected to buffing to clean the surface of any contaminants and to roughen the surface. The term "tire tread" as used herein is intended to include not only a conventional tire tread provided with grooves and/or lugs, but also "build-up". Build-up is a strip of cured rubber which does not have any tread thereon and is designed to provide a thickened surface on the tire casing prior to application of the tire tread.

After the casing and tread have been buffed, the surfaces to be bonded together are subjected to a priming treatment. The term "priming treatment" as used herein means any treatment which optimizes the surface of the substrate for reception of the adhesive and subsequent heat curing of the adhesive to bond the substates together. Thus, it will be appreciated that various different types of priming treatment may be employed, and the invention is not limited to any particular priming treatment. Examples of suitable priming treatments are discussed below.

According to one possible approach, the surfaces of the substrates may be treated with a halogen-containing priming agent. Typically, the priming agent is a halogen-containing oxidizing agent selected from various N-halohydantoins, N-halosulfonamides, N-haloamides and N-haloimides, and combinations thereof. Examples of suitable N-halohydantoins include 1,3-dichloro-5,5-dimethylhydantoin, 1,3-dibromo-5,5-dimethylhydantoin, 1,3-dichloro-5-methyl-5-isobutylhydantoin, and 1,3-dichloro-5-methyl-5-hexylhydantoin. Examples of suitable N-halosulfonamides are N,N,N', N'-tetrachloro-oxybis(benzene sulfonamide); N,N,N',N'-tetrachloro-4,4-biphenyldisulfonamide, N,N,N', N'-tetrachloro-1-3 benzene disulfonamide, and N,N,N',N'-tetrabromo-oxybis(benzene sulfonamide). Examples of suitable N-haloamides include N-bromoacetamide and tetrachloroglycoluril. Examples of suitable N-haloimides include N-bromosuccinimide and various mono-, di- and trichloroisocyanuric acids. A preferred priming agent is 1,3-dichloro-5,5dimethylhydantoin.

It has been reported (see, for example, U.S. Pat. No. 3,456,674) that violent reactions, which may be explosive in nature, may arise if primary or secondary alcohols having 2 to 7 carbon atoms, benzyl alcohol, phenol, lower substituted phenols, primary or secondary amines or lower alkyl sulfoxides are used as solvents for the above-listed halogenated primers. Preferred solvents for the halogenated primers are chlorinated hydrocarbons, such as methylene chloride and 1,1,1-trichloroethylene. Other solvents which can be used are methanol, tertiary butyl alcohol and cyclohexanol.

The priming agent is applied to the buffed surfaces of the casing and the tread as a solution in an inert solvent, for example a volatile organic solvent. Examples of suitable organic solvents are dichloromethane, ethyl acetate and acetone. The concentration of the priming agent solution is generally from about 0.1 to 10% by weight, preferably about 0.5 to about 5% by weight, based on the total weight of the solvent and the priming agent. Preferably, the priming agent is a 5 weight percent solution of 1,3-dichloro-5,5-dimethylhydantoin in dichloromethane. The priming agent rate of application is 0.001 to 0.02 grams per square inch, typically about 0.003 to 0.01 grams per square inch.

The priming agent may be applied to the casing and the tread using any conventional mode of application, for example brushing or spraying. One coat of the priming agent is generally sufficient, but it is important to ensure that all of the substrate surface has been wetted with the priming agent. Preferably, the priming agent is applied at the rate of about 0.005 to 0.035 grams per square inch, typically about 0.010 to 0.015 grams per square inch. The priming agent solution generally dries within a matter of minutes, to leave the primed surfaces ready for application of the adhesive composition.

The above-described priming treatment is not the only priming technique which can be employed. Thus, it is possible to prime the rubber surface by oxidation methods using oxidative reactants which will introduce functional groups upon application to the rubber surface, the type and number depending on reaction conditions and subsequently occurring chemical reactions. In a strict sense, the mechanism is not an "oxidation", but the introduction of oxygen groups are usually facilitated. In the case of some reactants (particularly the mineral acids), other functional groups may be introduced which will enhance the interaction with unreacted urethane. Some of the groups introduced are derived from epoxide, dioxetane (a 4-membered ring with 2 carbons and 2 oxygens), aldehyde, ketone, organic carboxylic acid and alcohol. Reactants which may be used are strong mineral acids such as nitric or sulphuric acid; bases such as sodium hydroxide or potassium hydroxide; peroxides such as hydrogen peroxide or t-butyl hydroperoxide; inorganic oxidants such as potassium permanganate and potassium dichromate; organic acids, such as formic and trifluoroacetic; and peracids such as peroxyacetic and peroxybenzoic acid. Other reactants are singlet oxygen sensitizers such as Rose Bengal, methylene blue and aqueous ozone, reactants which cause addition of halogen such as HBr, HCl, $Cl_2$ and $Br_2$, reactants which cause addition to carbon-carbon unsaturation using R-substituted 1,2,4-triazoline 3,5 diones, where R is methyl, phenyl, butyl or naphthyl; or bis-(p-3, 5-dioxo-1,2,4-triazoline-4-yl-phenyl) methane. Priming can also be effected using high energy radiation, including microwave discharge, corona discharge and plasma treatment. The resulting surface modification will depend on the surface chemistry, the gases present and energy level employed.

The heat-curable polyurethane adhesive compositions employed in the present invention are generally described in U.S. Pat. No. 4,390,678, the disclosure of which is hereby incorporated by reference. The polyurethane adhesive compositions are a one-part system, and comprise an isocyanate-terminated prepolymer and a polyhydroxide curing agent. The isocyanate-terminated prepolymer is generally in liquid form and is formed by reacting a polyether polyol or polyester polyol with a molar excess of an polyisocyanate. Preferably, the prepolymer is formed by reacting the polyisocyanate with a polyester polyol. In order to reduce reactivity of the polyhydroxide curing agent and to prevent substantial gelling or hardening of the adhesive composition during storage, the polyhydroxide compound is preferably present as an insoluble phase in the liquid isocyanate-terminated liquid prepolymer phase.

The polyol compounds used to form the isocyanate-terminated prepolymer contain at least two hydroxyl groups attached to an organic backbone comprising an alkyl, alkylene, polyester, polyether, polyacetone or the like. Blends and mixtures of those polyol compounds may also be used. The polyol compounds can be fluid at room temperature and have a molecular weight and hydroxyl functionality which results in a prepolymer of manageable viscosity. Typically, a suitable polyol compound will have a molecular weight of less than 20,000, more typically less than 5,000. The molecular weight may be in the region of 500 to 3,000 in order to obtain optimum viscosity and reactivity. Hydroxyl functionality typically ranges from 2 to 6.

Examples of preferred polyol compounds include commercial polyoxalkylenes having at least two terminal hydroxyl groups in the molecule, such as polyethylene glycols, polypropylene glycols, or polybutylene glycols, hydroxyl-containing polyesters, hydroxyl-containing polyesteramides, polyalkylene ether glycol compounds, polyoxyalkylene compounds, castor oil, tung oil and their alkyd modifications, dihydroxy terminated polyesters produced, for example, by esterification of adipic acid, sebacic acid, and other dicarboxylic acids with long chain polyoxyalkylene glycols, and polyepsilon caprolactonediols. The most preferred hydroxyl containing compounds are the polyoxyalkylene diols or triols of appropriate molecular weight.

The polyisocyanate compounds suitable for reacting with the polyol compound to form the isocyanate-terminated prepolymer include any organic aromatic polyisocyanates having an isocyanate functionality of about two or greater and at least 1 aromatic group. The polyisocyanate may have any number of aromatic groups, the number typically ranging from 1 to 10, preferably from 2 to 4, aromatic groups. The polyisocyanate may also contain other substituents which will not substantially adversely affect the isocyanate-terminated prepolymer or the adhesive properties of the ultimately obtained, heat cured aromatic polyurethane composition. The polyisocyanate compound can also comprise a mixture of aromatic and aliphatic isocyanates.

Typical aromatic polyisocyanates include diphenylmethane diisocyanate compounds (MDI), including its isomers, diphenylmethane, 4,4'-diisocyanate, diphenylmethane 2,2'-diisocyanate, diphenylmethane 2,4'-diisocyanate and mixtures thereof; toluene diisocyanate compounds (TDI), including 2,4-toluene diisocyanate, and 2,6-toluene diisocyanate and mixtures thereof; isomers of naphthalene diisocyanate, isomers of triphenylmethane triisocyanate, and mixtures thereof. Preferably, the polyisocyanate is a diisocyanate having an average functionality from about 1.5 to 3.0 where a fractional functionality can arise by mixing isocyanates of different functionalities. For optimum strength, the diisocyanate will have a functionality of 2. The preferred MDI and TDI aromatic diisocyanates are diphenylmethane 2,4'- and 4,4'-diisocyanate, and 2,6- and 2,4- toluene diisocyanate and mixtures thereof.

The polyhydroxy compound curing agent preferably comprises a solid polyhydroxy compound substantially insoluble in the liquid prepolymer which can be dispersed or suspended throughout the prepolymer phase and maintained until the adhesive is heat-activated and cured. The preferred polyhydroxy compounds are finely divided solid polyhydroxy compounds with at least two OH groups attached to an organic backbone, having melting points at or above the preferred curing temperature. Typically, to achieve the desired level of crosslinking and hardness in the cured polyurethane adhesive, the polyhydroxy compound of the separate phase will have from 2 to 6 hydroxyl groups.

The polyhydroxy compounds selected for mixing with the prepolymers should have an appropriate hydroxyl functionality and should have a melting point above the curing temperature. If during storage and before use, the melting point of the solid is exceeded, the system can begin to cure. Since temperatures of the order of 140° to 400° F. (60° C. to 204° C.) may be employed effect curing, the preferred compounds have melting points in the range of 140°–410° F. (60°–210° C.). In general, the solid compound should be finely divided, about 325 mesh or smaller, to promote dispersion in the fluid prepolymer phase.

Examples of solid polyhydroxy compounds to be used as curing agents include commercial pentaerythritol, dipentaerythritol, tripentaerythritol, and mixtures thereof, the methyl alpha d-glucoside of corn starch, sucrose (m.p. 170° C.), lactose (m.p. 202° C.), d-mannitol (m.p. 166° C.), anhydrous sorbitol (m.p. 112° C), dulcitol (M.P. 188.5° C.) and erythritol (m.p. 120° C.). Other solid polyhydroxy compounds, such as copolymers of vinyl ester with ethylenic unsaturated compounds having three or more ester groups replaced by hydroxyl groups can be used.

The preferred polyhydroxy compound for use as the curing agent the adhesive composition is pentaerythritol, a crystalline, odorless, white, nonhygroscopic, practically non-volatile, tetrahydric neopentyl alcohol of the formula 2,2-bis(hydroxymethyl)-1,3-propanediol. Pentaerythriotol is available commercially, for example, as Hercules® PE-200, a product of Hercules, Incorporated. Its melting point has been reported as 260° C. to 262° C. Pentaerythritol can be used with its dimers, trimers, and other isomers, its esters and the esters of its dimers and trimers, and mixtures thereof.

The OH/NCO ratio, i.e. the ratio of OH groups in the polyhydroxide compound curing agent to NCO groups in the liquid isocyanate-terminated prepolymer is generally less than about 2:1. Preferably, the OH/NCO ratio is from about 0.5:1 to 1.8:1, and more preferably from about 0.1:1 to 1.5:1.

The adhesive composition may also contain one or more plasticizers to improve the viscosity and bubble release of the uncured adhesive and the hardness, flexual modulus, and cure time of the cured adhesive. Suitable plasticizers include phthalates, phosphates, chlorinated biphenols and polyphenols, aromatic oils, chlorinated waxes or paraffins, adipates, synthetic rubber polymers, long oil derived from linseed oils and wood resins, and polysulfite rubber.

Normally, the amount of plasticizer ranges from about 1% by weight of solids in the polyurethane to about 25% in order to obtain good dispersion of the polyhydroxy compound curing agent phase. Preferred plasticizers include N-ethyl toluene sulfonamide and diisodecylphthalate (DIDP). In addition, N-ethyl toluene sulfonamide is particularly useful as an aid in the introduction and dispersion of solids throughout the prepolymer, while DIDP works especially well to reduce viscosity.

Fillers, extenders, thickeners, catalysts, pigments, and the like can also be included in the polyurethane composition. Neutral fillers are ordinarily preferred in order to avoid gasing during storage. Highly alkaline materials may have an undesired catalytic effect. Highly acidic materials may attack the urethane or carbamate linkages in the prepolymer.

The heat curable adhesive composition is applied to the casing and tread which have been treated with the priming agent. The adhesive should be applied in a manner to adequately "wet" both surfaces filling all interstices in a manner to provide an average bond line thickness of 1 to 20 thousandths of an inch, preferably 3 to 10 thousandths of an inch. The adhesive is generally in form of a thixotropic liquid, and is applied by spreading over the entire surfaces to be contacted. The desired average bond line thickness can be achieved when the adhesive is applied at a rate of 0.1 to 0.8 grams per square inch, for example 0.2 to 0.6 grams per square inch.

After application of the adhesive is completed, the tread and casing are brought together and the ends of the tread stapled together to hold in place on the casing. A perforated polymeric film material, for example polyethylene, is applied to the outer surface of the tread, and the tire is "stitched" by applying pressure to the tread using rollers or the like. The stitching process more evenly distributes the adhesive between the casing and the tread.

A tire tread retaining means, usually a perforated tire tube, is then stretched onto the tire over the polyethylene film to hold the tread in place during the curing process, especially at the edges of the tread. Obtaining a good bond at the edges is important in that it reduces the incidence of edge-lifting of the tread from the casing during use.

The casing/tread assembly is then placed in a curing envelope and subjected to heat to cure the adhesive composition. The function of the polymeric film is to prevent any adhesive which may exude from the sides of the tire from contacting and adhering to the inner surface of the heating envelope or to the inner surface of the perforated tire tube.

As noted earlier, the curing temperature is typically within the range of 140°–400° F. , and is typically 210° F.–250° F. (98°–121° C.). Normally, no significant curing is carried out at temperatures below 140° F. (60° C. ) and rarely is the curing temperature as low as 185° F. (85° C. ).

The curing is preferably carried out under pressure so as to ensure that the tread conforms to the compound outer curvature of the casing. Typically, the pressure applied isn about 80 PSI to 100 PSI relative to atmospheric, for example 85 to 90 PSI.

The time taken to effect the curing will depend on the curing conditions. Typically, the cure time is about 3 hours when the cure temperature is about 220° F. and the relative pressure is 85 PSI.

After the curing process is completed, the heating is stopped and the pressure on the curing envelope is returned to atmospheric. If the tread material used is build-up, the tire is removed from the curing envelope and the perforated tube and polyethylene film removed. The edges of the build-up on the tire are then buffed at about 45 degrees to conform the edges to the external contour of the casing.

EXAMPLES

The invention will now be further illustrated by reference to the following examples.

EXAMPLE 1

(a) Casing Preparation

The tire casing is allowed to equilibrate at shop temperature and humidity for at least 12 hours before beginning tire retreading. The tire is buffed to predetermined undertread depth and buffing radius according to predetermined specifications. The casing circumference is then measured to the nearest ¼ inch.

(b) Tread and Casing Priming

The tread/build-up (hereafter "build-up") is cut longer than the tire circumference, for example by about 1 inch, and placed on a tread bench. The uncemented side of the build-up has been previously buffed twice to clean and roughen the surface.

An even coat of primer solution is applied to the double buffed side of the build-up. This is performed by applying a 5% solution (by weight) of 1,3-dichloro-5,5-dimethylhydantoin in methylene chloride. Areas of a size of approximately 2×2 inches are wetted and even distribution of the primer solution is insured by spreading with a brush. The primer solution is also applied to the splice edges of the build-up.

The buffed casing is mounted on a tire spreader. The tire is slowly rotated and the primer solution applied to the buffed portion of the casing crown.

The solvent is allowed to evaporate before application of the adhesive.

(c) Adhesive Application

The adhesive is applied to the primed surface of the build-up in small patches. The adhesive is spread evenly on the build-up surface using a trowel to a thickness of about 15 thousandths of an inch. Any excess adhesive is removed.

An even coating of adhesive is also spread onto the edges of the build-up to be joined as the splice.

Adhesive is also spread evenly on the primed casing surface to a thickness of about 15 thousandths of an inch. This is accomplished by applying the adhesive in small amounts via the trowel while the casing is slowly rotated. As the tire is rotated moderate pressure on the casing by the trowel will remove undesired adhesive by doctoring action.

(d) Building the Tire Composite

The build-up is placed on the casing and the two adhesive coated surfaces mated. The ends of the splice are mated together and stapled together with setting staples every ½ inch. Perforated polymer film, for example polyethylene film, preferably triple folded (three thicknesses, 3 inches wide), is centered onto the build-up and stapled onto the build-up. The tire is then rotated on the spreader, and the polymer film wrapped around the surface of the build-up as the tire rotates. The free end of the film is then stapled onto the surface of the tire through the area containing the setting staples.

A perforated tire tube is then stretched onto the tire over the polymer film. Care must be taken not to move the build-up from the centered location on the casing.

The build-up is "stitched" onto the casing by manually pressing a roller against the build-up. The edges of the tire are checked to ensure that no polymer film has become trapped between the casing and the build-up.

A wick of nylon cloth is then loosely stapled onto the perforated tire tube, and the tire is placed in a curing envelope using conventional retreading sealing apparatus.

(e) Curing and Inspection

The curing envelope containing the tire is then placed in a heating and pressure chamber, and the curing envelope connected to the exhaust line of the chamber. A partial vacuum is generated in the envelope and the chamber pressure is then increased to a relative pressure of about 85 PSI. When the pressure in the chamber reaches about 70 PSI, the pressure in the envelope is returned to atmospheric pressure and air at about 50 to 80 PSI, typically a pressure less than that in the chamber, for example 70 PSI, is reintroduced into the envelope. In this way, pressure is applied to regions at the bottom of the tread grooves to ensure complete adhesion of the tread surface to the tire casing. The air pressure is applied interiorly of the envelope throughout the curing process. The purpose of the wick is to prevent the valve of the envelope closing against the tread surface and consequently preventing escape of air from the curing envelope during initial pressurization. The wick also allows for the above noted reintroduction of air at 70–80 PSI. The curing is carried out at 210° to 250° F. and a relative pressure of 85 PSI for approximately 4 hours.

When the curing process is completed, the envelope is removed from the curing chamber, and the tire removed from the curing envelope. The wick and the perforated tube and the polymer film are then removed and the tire examined to ensure that no edge-lifting or tread shifting has occurred.

The build-up edges are then buffed at 45 degrees using a medium grit grinder to conform the edges to tire contour. The tires are then grooved with a rib design using a conventional grooving iron.

(f) Tire Testing

To insure the viability of a retreaded tire produced according to the invention, and to determine its longevity in an end use application, the tire was submitted to a standard test having increasing severity of testing conditions. The tire was held against a 67 inch diameter drum at the full rated load, as specified by the U.S. Department of Transportation, and was run at a speed of 35 miles per hour for 88 hours. At the end of this time, the tire was examined closely and no apparent sites of adhesive failure or delamination were observed.

EXAMPLE 2

In order to demonstrate the superiority of the method and adhesive system of the present invention, the following comparison was carried out. Four retreaded tires were built, two according to the present invention and two using the approach described in U.S. Pat. No. 4,544,427 to Hausch, and the four tires were subjected to the above-mentioned standard test specified by the U.S. Department of Transportation. As will be seen from the results described below in Table 1, tires 1 and 2 built according to the present invention showed no signs of failure even after over 260 hours on the test drum at 35 miles per hour. In contrast, tires 3 and 4 built following the Hausch approach when subjected to the same test conditions failed after 6 hours and 20 hours respectively.

The Hausch approach followed that described in the working examples of the '427 Hausch patent. The adhesive designated in Table 1 as L-42 (Adiprene L-42/Catur 21) was obtained from The Firestone Tire and Rubber Company. The adhesive designated in Table 1 as UR-1100 was supplied by H. B. Fuller and is described in the present application in accordance with the teachings of U.S. Pat. No. 4,390,678. Tires 1 and 3 were primed using a 5 wt % 1,3-dichloro-5,5-dimethylhydantoin/methylene chloride priming solution (primer A) and tires 2 and 4 were primed using a 3 wt% trichloro-s-triazinetrione/butylacetate priming solution as described by Hausch (primer B).

Table 1 below summarizes the results of the comparative tests.

TABLE 1

| Tire | Adhesive | Primer | Hours On Roadwheel | Tire Failed? |
| --- | --- | --- | --- | --- |
| 1 | UR-1100 | Hydantoin | 266 | No |

TABLE 1-continued

| Tire | Adhesive | Primer | Hours On Roadwheel | Tire Failed? |
|---|---|---|---|---|
| 2 | UR-1100 | Triazine | 285 | No |
| 3 | L-42 | Hydantoin | 6 | Yes |
| 4 | L-42 | Triazine | 20 | Yes |

During the initial comparative work conducted by the inventors, the adhesive supplied by H. B. Fuller and designated NP-6001 was used. However, it was later discovered that some formulation changes had been made to the NP-6001 adhesive composition supplied to the inventors which caused that particular formulation to not perform as well as with previous batches. In light of this, the NP-6001 adhesive was not used and UR-1100 was used instead.

Four new Bridgestone R293 tires were used for the tests. Tires 1 through 4 were built as follows:

Tire 1: UR-1100 adhesive, 5% primer A, cured 3 hours 30 minutes plus warm-up at 210° F.

Tire 2: UR-1100 adhesive, 3% triazine primer B-2 coats on each surface, cured 3 hours 30 minutes plus warm-up at 210° F.

Tire 3: L-42/ Caytur 21 adhesive, 5% primer A, 24 hour room temperature cure.

Tire 4: L-42/ Caytur 21 adhesive, 3% triazine primer B-2 coats on each surface, 24 hour room temperature cure.

The day prior to tire building, the four tires were left for 12 hours at ambient temperature, under dry conditions to allow stabilization of temperature and moisture. The tires were then buffed to a 22 inch radius and trimmed to an 8 inch width. Pieces of tire tread were cut to the appropriate length and the 4 treads and 4 casings were primed using primers A and B according to Table 1. One coat of primer A was used on tires 1 and 3 and two coats of primer B were used on tires 2 and 4. Prior to priming tires 2 and 4, the casings and the treads were washed with acetone. The surfaces were dried prior to applying the respective adhesives.

The L-42 adhesive prepolymer was prepared by compounding the following materials.

| A Side | | |
|---|---|---|
| DOP 27.17 grams | Black | 54.34 grams |
| | Mixed first - then add | |
| L-42 362.26 grams | Acetone | 36.23 grams |
| | B Side | |

Caytur 21 to give 100% theoretical cure (NCO × 18.783).
DOP = dioctylphthalate.

The adhesives were then applied to the respective tread and casing surfaces. This was done by applying 240 grams of the adhesive to the tread surface and spreading the adhesive evenly onto the tread using a hand trowel. A layer of adhesive was also applied onto the splice edges. 240 grams of the adhesive were then applied to the casing surface and spread evenly using a hand trowel. The tread was then applied to the casing and the treads stapled. Then, for each tire, three layers of polyethylene film were applied over the tread and a perforated tire band was stretched over the film and centered on the casing. The tire was was hand-stitched for approximately 8 revolutions and a wick applied over the film and stapled into the tire tread. Each tire was placed in an envelope and rotated to line up the wick with the side vent valve in the envelope. The envelopes containing tires 3 and 4 were then placed into a pressure chamber and a partial vacuum developed in the envelopes. The pressure chamber door is shut and the chamber pressurized. When the pressure in the chamber reaches 70 PSI, the envelope is brought to atmospheric pressure and when the chamber reaches 85 PSI, air is injected into the envelope to a pressure of 70 PSI. In this way, the pressure in the chamber is higher than the pressure in the envelope, and reduces any tendency for the tread to separate from the casing during the curing process. Tires 3 and 4 were then cured at room temperature for 24 hours. Tires 1 and 2 were cured under the same pressure conditions and at 210° F. for 3 hours and 30 minutes. After curing, the 4 built tires were removed from the envelopes and were subjected to the above-mentioned standard test at 100% of the rated load and pressure at 35 miles per hour.

We claim:

1. A method for bonding at least two elastomeric substrates together, wherein one of said substrates is a tire casing and another substrate is a tire tread, said method comprising the steps of:

subjecting said substrate to a priming treatment with a priming agent selected from the group consisting of a N-halohydantoin, N-halosulfonamide, a N-haloamide and a N-haloimide to form a primed substrate;

applying a heat-curable polyurethane adhesive composition to said primed substrate, said adhesive composition comprising a polyhydroxide compound curing agent and an aromatic isocyanate-terminated prepolymer, said aromatic isocyanate-terminated prepolymer being prepared by reacting an aromatic polyisocyanate with a compound selected from the group consisting of a polyether polyol and a polyester polyol;

contacting said substrates; and heat-curing said contacted substrates under superatmospheric pressure to bond said substrates together.

2. A method according to claim 1, wherein said priming agent is a N-halohydantoin.

3. A method according to claim 2, wherein said N-halohydantoins is selected from the group consisting of 1,3-dichloro-5,5-dimethylhydantoin, 1,3-dibromo-5,5-dimethylhydantoin, 1,3-dichloro-5-methyl-5-isobutylhydantoin and 1,3-dichloro-5-methyl-5-hexylhydantoin.

4. A method according to claim 3, wherein said N-halohydantoin is 1,3-dichloro-5,5-dimethylhydantoin.

5. A method according to claim 4, wherein said 1,3-dichloro-5,5-dimethylhydantoin is in the form of a solution in organic solvent.

6. A method according to claim 5, wherein said 1,3-dichloro-5,5-dimethylhydantoin is in the form of an approximately 1 to 5 weight percent solution in dichloromethane.

7. A method according to claim 1, wherein said N-sulfonamides is selected from the group consisting of N,N,N'.N'-tetrachloro-oxybis(benzene sulfonamides), N,N,N', N'-tetrachloro-4,4-biphenol disulfonamides, N,N,N', N'-tetrachloro-1,3-benzene disulfonamide and N,N,N',N'-tetrabromo-oxy-bis(benzene) sulfonamides.

8. A method according to claim 1, wherein said N-haloamide is selected from the group consisting of N-bromoacetamide and tetrachloroglycoluril.

9. A method according to claim 1, wherein said N-haloimide is selected from the group consisting of N-bromosuccinimide and mono-, di- and trichloroisocyanuric acids.

10. A method according to claim 1, wherein said prepolymer is a substantially liquid phase and said polyhydroxide compound is a solid phase insoluble in and disposed throughout said substantially liquid phase.

11. A method according to claim 1, wherein said curing is carried out at a curing temperature of 140° F. to 400° F.

12. A method according to claim 11, wherein said curing temperature is 210° F. to 250° F.

13. A method according to claim 1, wherein the ratio of OH groups in the solid and soluble 14. A method according to claim 13, wherein said OH/NCO ratio is about 0.5:1 to 1.8:1.

15. A method according to claim 1, wherein said pressure is about 80 to 100 PSI relative.

16. A method for bonding at least two rubber substrates together, wherein one of said substrates is a tire casing and another said substrate is a precured tire tread, said method comprising the steps of:

applying to said substrates a halogen-containing priming agent selected from the group consisting of a N-halohydantoin, a N-halosulfonamide, a N-haloamide and a N-haloimide;

applying a heat-curable polyurethane adhesive composition to said priming agent coated substrates, said composition comprising a polyhydroxide compound curing agent and an isocyanate-terminated prepolymer, said isocyanate-terminated prepolymer being prepared by reacting an aromatic polyisocyanate with the compound selected from the group consisting of a polyether polyol and a polyester polyol;

contacting said substrates; and heat-curing said contacted substrates under superatmospheric pressure to bond said substrates together.

* * * * *